United States Patent
Sinks et al.

(10) Patent No.: US 12,407,699 B2
(45) Date of Patent: *Sep. 2, 2025

(54) ARTIFICIAL INTELLIGENCE-BASED LATERAL MOVEMENT IDENTIFICATION TOOL

(71) Applicant: Bank of America Corporation, Charlotte, NC (US)

(72) Inventors: Steven E. Sinks, Scottsdale, AZ (US); Jonathan Sheedy, Poynton (GB)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,321

(22) Filed: Dec. 4, 2023

(65) Prior Publication Data

US 2024/0106729 A1  Mar. 28, 2024

Related U.S. Application Data

(63) Continuation of application No. 18/176,080, filed on Feb. 28, 2023, now Pat. No. 11,888,720, which is a continuation of application No. 17/466,997, filed on Sep. 3, 2021, now Pat. No. 11,632,321, which is a
(Continued)

(51) Int. Cl.
*H04L 43/10* (2022.01)
*G06N 5/04* (2023.01)
*H04L 9/40* (2022.01)
*H04L 67/06* (2022.01)
*H04L 41/0893* (2022.01)

(52) U.S. Cl.
CPC .......... *H04L 63/1416* (2013.01); *G06N 5/04* (2013.01); *H04L 43/10* (2013.01); *H04L 67/06* (2013.01); *H04L 41/0893* (2013.01)

(58) Field of Classification Search
CPC ..... H04L 43/10; H04L 67/06; H04L 41/0631; H04L 41/069; H04L 41/0893; H04L 41/16; H04L 63/1425; H04L 63/1416; G06N 5/04; G06N 3/08; G06N 5/01; G06N 5/022; G06N 7/01; G06N 20/00
See application file for complete search history.

(56) References Cited

U.S. PATENT DOCUMENTS

| 6,388,758 | B2 * | 5/2002 | Kawanabe | ............ G06K 15/00 358/1.15 |
| 6,684,257 | B1 | 1/2004 | Camut et al. | |
| 6,754,699 | B2 | 6/2004 | Swildens et al. | |

(Continued)

*Primary Examiner* — Abdullahi E Salad
(74) *Attorney, Agent, or Firm* — Banner & Witcoff, Ltd.

(57) ABSTRACT

A lateral movement identification tool analyzes communications sent and received from a local host to identify potential instances of lateral movement. When the host-based lateral movement identification tool identifies a host to host connection, the tool processes one or more artificial intelligence algorithms to analyze information from local network resources including a directory service, a local network system such as a network basic input/output system, a domain name system, and event logs. The lateral movement identification tool correlates the aggregated information with identified host to host messaging and sends alerts when lateral movement is suspected. Alerts may be either presented locally or provided to a central console based on configuration information.

20 Claims, 4 Drawing Sheets

Related U.S. Application Data continuation of application No. 16/934,266, filed on Jul. 21, 2020, now Pat. No. 11,146,472.

(56) References Cited

U.S. PATENT DOCUMENTS

| | | | |
|---|---|---|---|
| 7,747,662 B2 | 6/2010 | Vivekanand | |
| 8,844,033 B2 * | 9/2014 | Song | H04L 67/02 |
| | | | 726/25 |
| 8,863,284 B1 | 10/2014 | Polyakov et al. | |
| 8,959,643 B1 | 2/2015 | Invernizzi et al. | |
| 9,591,006 B2 * | 3/2017 | Siva Kumar | H04L 63/10 |
| 9,686,296 B1 | 6/2017 | Murchison et al. | |
| 9,729,558 B2 | 8/2017 | Liu et al. | |
| 9,992,217 B2 | 6/2018 | Taylor et al. | |
| 10,334,083 B2 | 6/2019 | Katmor et al. | |
| 10,389,740 B2 | 8/2019 | Langton et al. | |
| 10,454,950 B1 * | 10/2019 | Aziz | H04L 63/1425 |
| 10,798,113 B2 * | 10/2020 | Muddu | G06F 16/24578 |
| 11,694,775 B1 * | 7/2023 | Maier | G06Q 10/10 |
| | | | 705/2 |
| 2010/0199345 A1 | 8/2010 | Nadir | |
| 2012/0272319 A1 | 10/2012 | Shi et al. | |
| 2012/0317642 A1 | 12/2012 | Royal et al. | |
| 2014/0298469 A1 | 10/2014 | Marion et al. | |
| 2016/0226905 A1 * | 8/2016 | Baikalov | H04L 63/1433 |
| 2017/0126717 A1 * | 5/2017 | Siva Kumar | H04L 63/1425 |
| 2019/0064752 A1 * | 2/2019 | Marwah | H04L 63/08 |
| 2019/0065739 A1 * | 2/2019 | Manadhata | H04L 63/1425 |
| 2019/0124097 A1 * | 4/2019 | Thomas | G06F 21/43 |
| 2019/0132344 A1 * | 5/2019 | Lem | G06N 20/00 |
| 2019/0156027 A1 * | 5/2019 | Dabak | G06F 9/4843 |
| 2019/0228161 A1 * | 7/2019 | Grindstaff, II | G06F 9/451 |
| 2020/0177617 A1 * | 6/2020 | Hadar | G06F 16/9024 |
| 2020/0314141 A1 * | 10/2020 | Vajipayajula | H04L 63/145 |
| 2020/0356882 A1 * | 11/2020 | Antoine | G06N 20/00 |
| 2021/0110294 A1 * | 4/2021 | Elewitz | G06N 20/00 |

* cited by examiner

ARTIFICIAL INTELLIGENCE-BASED LATERAL MOVEMENT IDENTIFICATION TOOL

CROSS REFERENCE TO RELATED APPLICATION

This application is a continuation of U.S. application Ser. No. 18/176,080, filed Feb. 28, 2023 entitled "Artificial Intelligence-Based Lateral Movement Identification Tool", which is a continuation of U.S. application Ser. No. 17/466,997, filed Sep. 3, 2021 entitled "Artificial Intelligence-Based Lateral Movement Identification Tool", which is a continuation of U.S. application Ser. No. 16/934,266, filed Jul. 21, 2020 entitled "Artificial Intelligence-Based Lateral Movement Identification Tool", all of which are incorporated by reference in their entirety.

BACKGROUND

Lateral movement refers to techniques that an unauthorized individual uses, after gaining initial access to a networked device, to move deeper into a network in search of sensitive data and resources. The unauthorized individual may attempt to navigate through the compromised environment and obtain increased privileges using various tools. Lateral movement allows a threat actor to avoid detection and retain access, even if discovered on the machine first accessed (e.g., "patient zero") or in cases of unauthorized access by a network user. After gaining initial access to a machine on a network, unauthorized individual may impersonate a legitimate user to move through multiple systems in the network. This involves gathering information about multiple systems, obtaining credentials, escalating privileges, and ultimately gaining access to the sensitive data and resources. In some cases, a network user may attempt to access, obtain credentials or otherwise use their credentials to gain unauthorized access to restricted data and/or resources.

Current methods used to protect enterprise computing systems (e.g., corporate computing networks, education institution computing networks, government computing networks, and the like) have a difficult time identifying in real time lateral movement between hosts (e.g., host to host communication rather than host to server or server to host communication) that may be associated with a network intruder and/or malicious inside threat. As such, identifying whether traffic to and from a host machine on a network is legitimate (e.g., a technical support person performing activities related to their job) or illegitimate (e.g., network traffic requiring additional investigation) has been difficult. For example, currently very few controls are capable of real time network traffic validation, such as associating a user and device type to a particular connection. Further, passive tools such as event logs may not directly correlate, in real time, host to host communication. As such, system administrators may use external add-on tools that are capable of pulling event logs to link a particular message and/or action to a user or computing device.

Other controls, such as Host Based Intrusion Detection solutions (HIDS) may search for known patterns in the network traffic but are not capable of identifying users utilizing legitimate host based and network-based tools to make unauthorized connections (also known in the threat actor community as living off the land). As such, a HIDS solution is better suited to monitoring and analyzing the internals of a computing system, the network packets on its network interfaces and the content of otherwise encrypted communications to make decisions about possible, ongoing, and/or successful attacks. Further, anti-virus and/or anti-malware tools may also rely on use of known patterns in possible malware, but are not very successful at identifying custom software or normal network communication or host to host based connections.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with accurately evaluating instruments for authenticity and validity. For example, aspects of the disclosure relate to cyber security for enterprise computing systems. One or more aspects of the disclosure relate to monitoring network communications using an artificial intelligence-based tool to identify unauthorized host to host messages.

A lateral movement identification tool analyzes communications sent and received from a local host to identify potential instances of lateral movement. When the host-based lateral movement identification tool identifies a host to host connection, the tool processes one or more artificial intelligence algorithms to analyze information from local network resources including a directory service, a local network system such as a network basic input/output system (NetBIOS), a domain name system (DNS), and event logs. The lateral movement identification tool correlates the aggregated information with identified host to host messaging and sends alerts when lateral movement is suspected. Alerts may be either presented locally or provided to a central console based on configuration information.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (i.e., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, control computers, nodes, personal computers, portable electronic devices, servers, worker computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some example arrangements in which the systems described herein may be used. Various other arrangements employing aspects described herein may be used without departing from the invention.

In a normalized network, mapped drives or network logon events between two or more host-based systems (e.g., host to host communications) tend to be unusual with the exception of support personnel actively fixing an issue and/or pushing an update that would otherwise originate from a host to server-based connection. As such, lateral movement including unauthorized and/or unexpected host to host communications may be an indication of potentially malicious, or otherwise unauthorized, activities on an enterprise network. Lateral movement may include three main stages: reconnaissance, credential/privilege gathering and escalation, and gaining access to other computers in the network.

During reconnaissance, an unauthorized individual (e.g., an attacker) observes, explores and/or maps the network, its users, and/or devices. Such mappings may allow the intruder to understand host naming conventions and network hierarchies, identify operating systems, locate potential payloads, and acquire intelligence to make informed moves. Further, threat actors deploy a variety of tools to discover a current network location, accessible computing resources, and may identify firewalls or other deterrents that are in place. Using this information, an attacker may then leverage many external custom tools and/or open-source tools to perform port scanning, proxy connections and other such techniques. Further, if the attacker employs built-in operating system or associated support tools, any attack or intrusion may be harder to detect.

Various built-in tools can be used during reconnaissance. For example, a network status tool may show a machine's current network connections. This information may be used for gaining knowledge about the network. Operating system configuration tools may provide access to the network configuration and location information. Network address files (e.g., an Address Resolution Protocol (ARP) cache) may provide information about IP addresses assigned to physical computing device addresses (e.g., a machine access control (MAC) address). This information can target individual machines inside the network. Routing information (e.g. a local routing table) may include communication paths for a connected host. Further, command line and scripting tools, allow quick identification of network systems to which the user may have administrator-level access.

Once an unauthorized individual has identified critical areas to access, login credentials may be gathered to allow entry. To move through a network, an attacker first needs valid login credentials, which obtained through unauthorized methods such as "credential dumping." For example, users may be tricked into sharing credentials by using one or more social engineering tactics such as typosquatting and phishing attacks. Additional methods may include "Pass the Hash" or "Pass the Ticket". These techniques provide methods of authenticating a user by taking advantage of authentication protocol characteristics, without having access to the user's password. Pass the Hash authentication—works by capturing valid password hashes that, once authenticated, allow the attacker to perform authentication actions on local or remote systems. Pass the Ticket allows unauthorized individuals whom have compromised a domain controller to generate a "golden ticket" offline that remains valid indefinitely until changed and can be used to impersonate a user, even after the user's password is reset. Some tools may be used to capture cached plain text passwords and/or authentication certificates from the memory of a compromised machine, which can then be used to authenticate to other machines. Additional tools, such as keylogging tools, may be used by unauthorized individuals to capture passwords directly when an unsuspecting user enters them via the keyboard. Once access to network resources has been established, internal network reconnaissance and subsequent bypassing of security controls to compromise successive hosts may be repeated, such as until the target data has been found and exfiltrated.

With administrative privileges secured, an unauthorized individual may gain deeper access into a network. In such cases, malicious lateral movement can be very difficult to detect because it can appear to be "normal" network traffic. As such, finding and removing network intrusions quickly is essential to avoid losses. Breakout time is the time it takes for an unauthorized individual to move laterally into other computing systems in the network after initially compromising patient zero. As such, an organization has a short period of time to detect, investigate, and/or remediate or contain the threat. With longer times, the unauthorized individual has a better chance of accessing or destroying critical data and resources.

To identify unauthorized communications between network hosts, a host-based application (e.g., a lateral movement identification tool) may utilize one or more artificial intelligence (AI) algorithms to analyze communications on network connections to and/or from a local host computing device (e.g., a desktop computer, a laptop computer, a workstation, and the like) to make alerting decisions based on an enumeration and/or correlation of information from one or more network resources (e.g., a directory service, a local network system such as a network basic input/output system (NetBIOS), a domain name system (DNS), event logs, and the like). The lateral movement identification tool may be configured to send alerts, as a push alert or a pull alert, based on information stored locally on each individual host for forensics purposes, with the ability for a backup copy to be pushed to a remote network storage device. Alerts may be either presented locally or provided to a central console based on configuration information.

The lateral movement identification tool executes one or more AI algorithms to analyze a host's network communication data to determine if a connection is coming from or going to another host, rather than a server. Further, because support personnel may make host to host connections during certain times of the day, the AI algorithm considers the time of day, as well as, information enumerated from the active directory associated with the device identifier of the computing device making the connection, typical connections of the host, and log files associated with a type of connection and the identifier of the computing device making the connection. In doing so, the lateral movement identification tool may be used to combat, not only external based network intrusions, but one of the largest threats to any computing network—soft unmonitored inside threat stemming from host to host based communication by utilizing an AI engine to enumerate and correlate data elements available on host-based networks to assist in the active detection and identification of possible nefarious actives associated with lateral movement from unauthorized individuals such as an active threat actor and/or a malicious insider.

Figure 1:
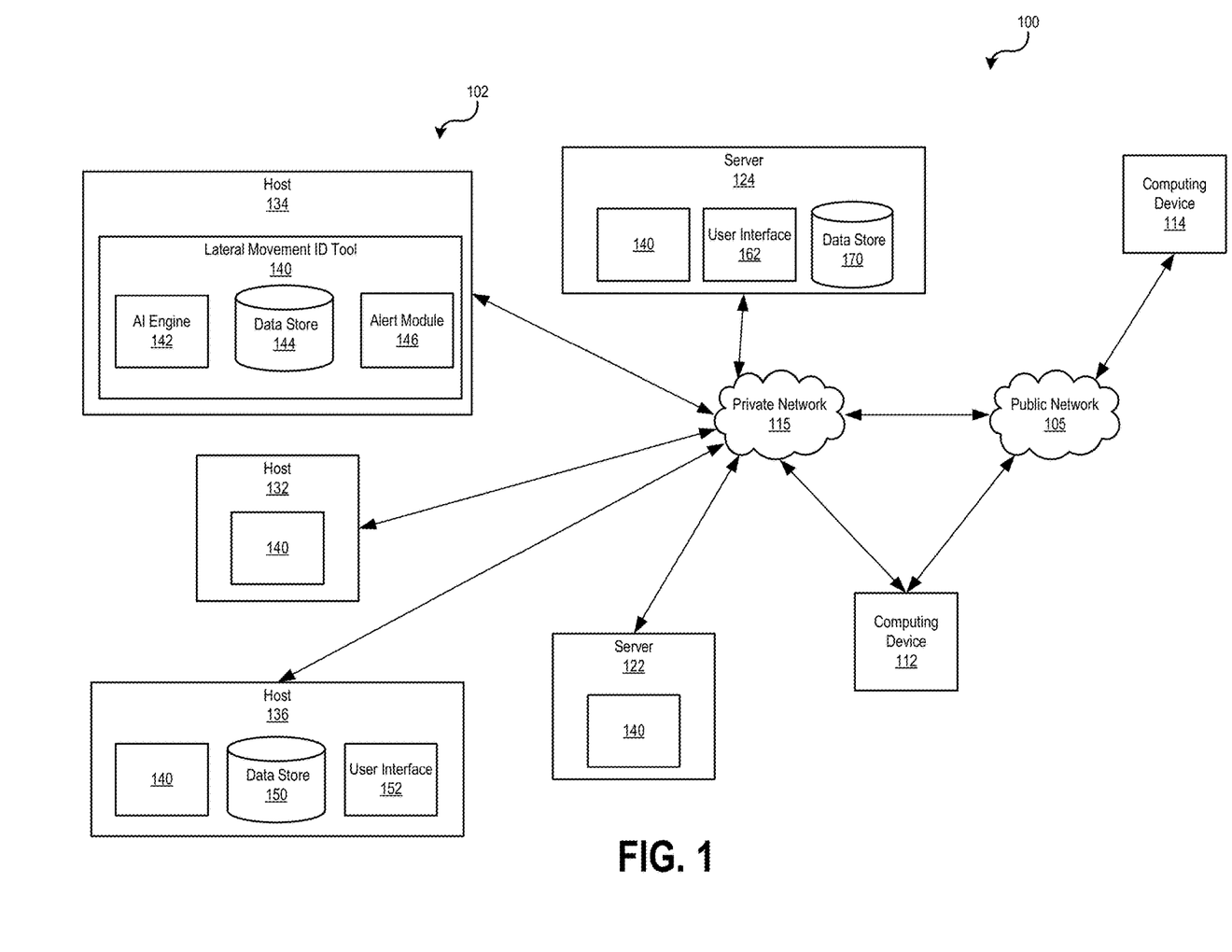
FIG. 1 shows an illustrative computing environment to identify lateral movement in a networked computing environment in accordance with one or more aspects described herein.

FIG. 1 shows an illustrative computing environment 100 to identify lateral movement in a networked computing environment in accordance with one or more aspects described herein. The illustrative computing environment 100 may include a plurality of computing devices (e.g., a computing device 112, a computing device 114) communicatively coupled via a public network 105 and/or a private network 115 to an enterprise computing system. The private network may be connected to one or more computing devices of the enterprise computing infrastructure 102 and/or devices external to the enterprise infrastructure (e.g., computing device 114). The enterprise computing system may include one or more computer machines or systems providing products and/or services to a plurality of users. In addition, the computer machines may include one or more computing devices providing security functionality including, for example, intrusion detection, event logging, monitoring and investigation of lateral movements, generation of alerts reporting suspected lateral movements, preparation of reports regarding lateral movements, machine learning, and/or performing remediation. The security functionality may be performed on a dedicated security computing machine and/or the security functionality may be distributed over a plurality of computing devices and/or processes. The computing environment 100 may include a plurality of servers (e.g., server 122, server 124), a plurality of hosts (e.g., hose 132, host 134, host 136), and the like. In some cases, the security functionality to identify and/or generate alerts corresponding to suspected lateral movement identified on the private network 115, may be performed by a lateral movement identification (ID) tool 140, which may include an artificial intelligence engine 142, a data store 144 and an alert module 146. In some cases, the lateral movement ID tool may operate from a central location (e.g., on the server 124) or may be distributed on a plurality of servers or hosts (e.g., host 132, host 134, and the like). The hosts and/or servers may include one or more data stores storing network communications information (e.g., data store 150, data store 170). Each element in computing environment 100 may include one or more computing machines and associated components operating computer software and data configured to perform one or more functions described herein.

In addition, and as illustrated in greater detail below, hosts and/or servers may be configured to perform various distributed processing functions described and store, access, and/or act on enterprise data and/or security data. An enterprise computing infrastructure 102 may include one or more computer machines and/or other computer components. In addition, and as illustrated in greater detail below, the enterprise computing infrastructure 102 may be configured to provide various enterprise and/or back-office computing functions for an organization. In some cases, the enterprise computing infrastructure 102 may load data from an enterprise data storage platform, manipulate and/or otherwise process such data, and return modified data and/or other data to the enterprise data storage platform and/or to other computer machines or systems in the computing environment 100.

The hosts and servers of the computing environment and the computing devices 112 and 114 may be any type of computer machine and may be linked to and/or used by a specific enterprise user (who may, e.g., be an employee or other affiliate of an enterprise organization controlling and/or interacting with a particular computing device). In some cases, a host (e.g., host 134) may be considered to be an administrative computing device, which may be any type of computer machine and may be linked to and/or used by an administrative user (who may, e.g., be a network administrator of an enterprise organization controlling and/or interacting with computer devices of the enterprise infrastructure 102). In some cases, the computing device 114 may by be any type of computer machines and may be linked to and/or used by one or more external users (who may, e.g., not be associated with an enterprise organization). The computing device 112 may be any type of computer machines and may be linked to and/or used by one or more internal users authorized to access the devices of the enterprise infrastructure. For example, the computing environment 100 may include a private network 115 that may interconnect hosts and servers of the enterprise infrastructure 102, and/or one or more other computer machines or systems, which may be associated with an organization), and a public network 105 that may interconnect the enterprise computer system with the private network 115 and/or one or more other computer machines such as computing device 114, systems, public networks, sub-networks, and/or the like).

In one or more arrangements, computer machines and the other systems in the computing environment 100 may be any computing device capable of providing a user interface, receiving input via the user interface, acting on the input, accessing or processing big data, controlling other computer machines and/or components thereof based on the input, and communicating the received input to one or more other computing machines. As noted above, and as illustrated in greater detail below, any and/or all of the computer machines of the computer environment 100 may, sometimes, be special-purpose computing devices configured to perform specific functions.

Enterprise computing infrastructures (e.g., a corporate network, a government network, an educational institution network and the like) may lack procedures and/or applications capable of identifying in real time lateral movement between hosts (e.g., host-to-host communication). Such communications may be legitimate communications (e.g., support personnel performing an update or other support services), however, in some cases, host-to-host communication may be associated with a network intruder, a malicious inside threat, and/or an otherwise unauthorized user attempting to gain access to private information stored on the network. Few applications provide real-time network traffic validation, such as by associating a user and device type to a particular connection. Some logging tools fail to directly correlate host to host communications in real time, so that administrators may be required to review data logs to link an action to a user and/or a computing device such as through use of add-on tools that pull communications logs from different machines. Other tools may use known patterns of network traffic in an attempt to identify but fail to identify unauthorized users utilizing legitimate host-based applications and/or network-based applications in an unauthorized manner, such as by monitoring and analyzing the internals of a computing system, the network packets on its network interfaces and/or content of encrypted communications when making decisions about possible or successful attacks. Additionally, other tools may use known patterns to identify possible malware, but these application may be unsuccessful when attempting to identify custom software and/or host-to-host based communications.

In general, normal network communications rarely utilize mapped drives and/or network login events between host computing devices (e.g., between host 132 and host 134). Such communications are unusual except, for example, communications initiated by support personnel from their machine (e.g., host 132) to correct a problem or to perform an update on another computing device (e.g., a user computing device, host 134, and/or the like). The lateral movement ID tool 140 may be a host-based application that may include the AI engine 142 which utilizes one or more artificial intelligence models and/or algorithms to analyze network connections to and from a local host, such as a user computing device (e.g., computing device 112, host 136, server 122, and the like) to, for example, make alerting decisions based on enumeration and/or correlation of information from network communication logs, network communications monitoring applications, network security applications, and/or event logs. The algorithms, models, and/or knowledge base may be stored in the data store 144. The AI engine 142 may utilize one or more machine learning algorithms to analyze data to determine if a network connection is initiated from another host or initiated locally to another host rather than a server, a time of day of the network connection, information enumerated from an operating system directory service based on identification information of the host (e.g., host 132, host 134, host 136) making the connection, information corresponding to network devices to which the host (e.g., host 132, host 134, host 136) typically communicates, and log files identifying the type of connection and the device ID making the connection.

Various machine learning algorithms may be used without departing from the scope of this disclosure, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the AI engine 142 may analyze data to identify patterns of activity, sequences of activity, and the like, to generate one or more machine learning datasets that may be stored in a local data store (e.g., data store 144) and/or a remote data store (e.g., data store 150, data store 170).

In some cases, the alert module 146 of the lateral movement ID tool 140 may be configured to push or pull alerts over the private network 115 with data accessed from the data store 144 stored locally on each individual host and may send at least a portion of the stored data to a different device, such as for forensics purposes and/or to facilitate an ability for a backup copy to be pushed to a remote network storage (e.g., data store 150, data store 170, and/or the like). Alerts may be presented locally to the host via a user interface (e.g., user interface 152) and/or via a centrally located user interface (e.g., user interface 162) depending on a specified configuration.

In some cases, AI Engine 142 may be configured to obtain and/or aggregate network communication information associated with the host 134 from one or more data sources, such as a directory service, a local network system such as a network basic input/output system (NetBIOS), a domain name system (DNS), event logs, and the like. For example, the AI engine 142 may aggregate communication data from the plurality of sources, a source local to the host 134 and/or a source at a different host in communication with host 134 via the private network 115. The AI engine may process one or more supervised and/or unsupervised algorithms to identify potentially unauthorized lateral movement, such as by identifying a source and/or a destination associated with the host's communication links in real time. In some cases, the AI engine 142 may correlate incoming communications with outgoing communications between host devices (e.g., workstation to workstation, desktop to workstation, and the like).

The AI engine 142 may aggregate communications data from a plurality of sources including data logs, directory services and in some cases, the AI engine 142 may monitor network communications to and from the associated host 134 sent via the private network 115, in real time, such as by monitoring messages received by the host and/or sent by the host. The AI engine 142 may process an AI algorithm that associates the time of day a message is received and/or sent, as well as, information enumerated from the directory service associated with the device identifier of the computing device making the connection, typical connections of the host 132, and log files associated with a type of connection and the identifier of the computing device (e.g., host 132, host 136, server 122, computing device 112, and the like)

making the connection. For example, the AI algorithm may process user information, user group information, a computing device type of the message source and/or the message recipient, message content, a duration of a message session, authentication and/or security information, encryption information, a trust level between domains associated with the source device and/or the recipient device, a result of a message session (e.g., an installation, an upgrade, a file transfer, and the like), and/or the like to identify possible instances of lateral movement. When a suspected case of lateral movement is identified, the lateral movement identification tool 140 may generate an alert via the alert module 146. For example, the alert module 146 may trigger an alert to be sent to trigger additional inspection of a suspect communication session. In some cases, the alert module 146 may disable, permanently or temporarily, a messaging session if unauthorized lateral movement is suspected. In some cases, the alert module 146 may communicate information to a central location for storage (e.g., data store 170) and/or to train a centrally located lateral movement ID tool and/or for use in training distributed lateral movement tools located on individual hosts throughout the network.

The AI algorithm processed by the AI engine 142 may be trained, or otherwise may learn, common communications and/or message sessions between hosts on the private network 115 and/or devices outside of the enterprise computing infrastructure 102 (e.g., computing device 112, computing device 114 and the like) communicating to hosts on the private network 115 via the public network 105 and/or the private network 115. For example, the lateral movement ID tool 140 may process communications (e.g., message header packets) to identify a source computing device associated with a communications session and/or a destination of a particular message in real time. If host to host communications is identified (e.g., a message sent from host 132 to host 134), the AI engine 142 may process further information from the message header (e.g., information contained in a messaging model such as the Open Systems Interconnection (OSI) reference model). In an illustrative cases, utilizing communications under the OSI reference model, the AI engine 142 may analyze information associated with the different layers of the OSI reference model, such as application layer information (e.g., network services information to applications outside the OSI reference model corresponding to an availability of intended communication partners and/or synchronization and agreement information on procedures for error recovery and control of data integrity, presentation layer information (e.g., information corresponding to commonality of an application layer of one host is readable by the application layer of another host and/or to facilitate translation to a common format), session layer information (e.g., information to establish, manage and/or terminate sessions between hosts, such as information identifying user session information, communication path information, a class of service information, and the like), transport layer information (e.g., information managing data segment information for use in reassembling data into a data stream such as for file transfers and the like, information corresponding to proper termination of virtual circuits, transport error and error recovery information and the like), and network layer information (e.g., connectivity and path selection information), data like layer information (e.g., data formatting information and network access control information).

Figure 2:
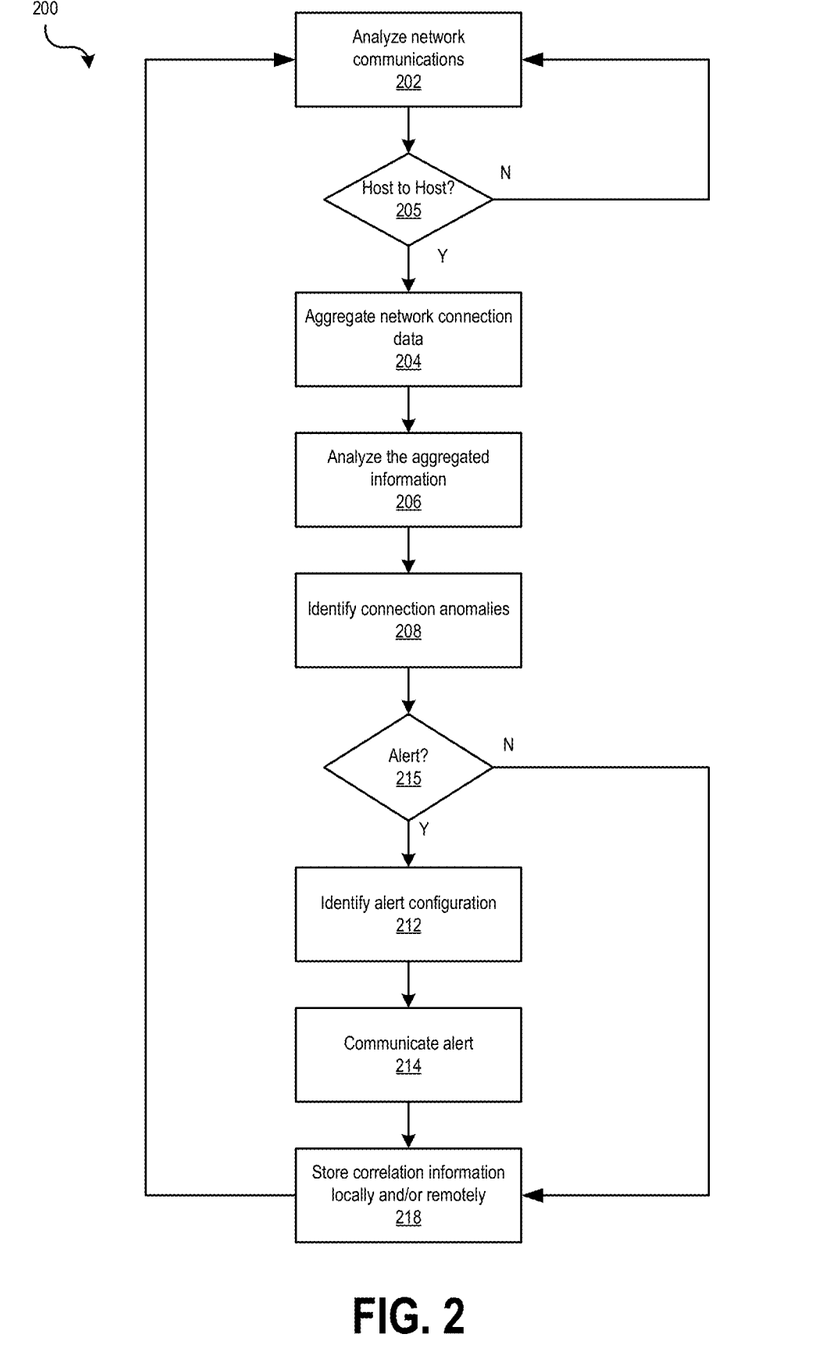
FIG. 2 shows an illustrative method for identifying lateral movement in a computing environment in accordance with one or more aspects described herein.

FIG. 2 shows an illustrative method for identifying lateral movement in a computing environment in accordance with one or more aspects described. At 202, the AI engine 142 may analyze communications to and/or from an associated computing device (e.g., host 134) for an indication of host to host communication (e.g., a host 134 as a source device and a host 132 as a destination device). If, at 205, a communication is not suspected of being associated with host to host communications (e.g., a host to server communication path), the AI engine continues to monitor network communications associated with the host 134 at 202. Alternatively, if a communication is suspected of being indicative of host to host communications, the AI engine may aggregate network connection data from a number of sources associated with the host including, for example, a directory service, a local network system such as a network basic input/output system (NetBIOS), a domain name system (DNS), event logs, and the like. At 206, the AI engine 142 may analyze the aggregated network connection data to identify characteristics associated with the communication that may be used as parameters in a supervised or unsupervised AI algorithm including, for example, user information (e.g., a user name, a user group, user security information, a user authentication method, user permissions, user group permissions, and the like), connection information (e.g., local network, remote network, device to device connection, and the like), a time of day or week, data accessed or requested to be accessed, data transfer size, data transfer type, installation information, and the like. For example, the AI engine may identify a user and the user's permissions to determine, based on the AI algorithm, whether the identified user in the normal course of their activities log into a particular host device (e.g., host 132, host 134) and/or whether other members of the user's group normally log into the particular host device.

In some cases, the AI engine 142 may identify a pattern of use associated with a user or user group to determine whether host to host communications may be a normal or expected part of their activities. For example, a user associated with an information technology (IT) group may perform direct communications from their local machine to other machines to perform an update of an application or assist in troubleshooting a user's device. Similarly, a user associated with a software development group or a software test group may also log into their local device to communicate directly to another device (e.g., a test host) to develop, debug, or otherwise test an application. As such, users associated with IT, development or test groups may have a low weighting assigned to a host to host communication parameter as analyzed by the AI algorithm. However, a user associated with a sales group or human resources group would not normally be expected to perform activities requiring host to host communications, such that a higher weighting value may be assigned to users of those, or similar, user groups. Weightings may change over time as the AI algorithm is trained during use for particular users and/or the associated user groups based on identified patterns of use based on the aggregated network connection data.

In some cases, the AI engine 142 may analyze a time of day associated with the suspect communication such as by analyzing a time of day at which time a user or a user of a particular user group may normally perform an action. As such, a weighting associated with a likelihood of unauthorized lateral movement may increase to a maximum value over a period of time after normal business hours end and may decrease over a period of time before normal business hours begin. For example, during business hours service personnel may perform an update or troubleshoot a reported problem on another computing device and may remotely access a remote host via the private network 115 via their local machine. As such, host to host communications for such users may be expected and an associated weighting value may be low. After normal business hours, users may stay late to solve a high priority problem, so that a weighting may be increased gradually over a period of time to a maximum at a time when normal network traffic is at a minimum based on continuing analysis by the AI engine 142 over time. Similarly, over a period of time before normal business hours, service personnel may initiate updates or troubleshoot problems on a user's machine, so that the weighting factor may decrease over that time. Each user or user group may have a different weighting factor assigned.

In some cases, information associated with the device type and/or device location may be analyzed by the AI engine 142. For example, the AI engine 142 may analyze the aggregated network communication information to identify if a particular host or host device type would normally be accessed or otherwise associated with the user connecting to the device and may assign weighting factor accordingly. In some cases, security information associated with the user may be analyzed by the AI engine 142, such as to determine whether local administration credentials, network administrator credentials, or the like are being used. In some cases, the AI engine may analyze the communication destination to determine whether a source or destination of a particular message is the host 134 or host 132 participating in the current communication link, or whether tunneling is being used or whether a host 134 is attempting to establish a connection with a single destination host, or with multiple destination hosts. In some cases, the AI engine 142 may analyze connections to determine whether connections are being dropped. For example, when scanning for accessible hosts, some connections might not be allowed by the firewall. The AI engine may analyze firewall logs to identify dropped attempts, such as single connections to a network host (e.g., a connection to host 134) or multiple connections to different hosts (e.g., connections from host 134 to host 132, host 136, and server 124).

After a communication in the aggregated network traffic data is identified as a possible case of lateral movement, the AI engine 142 may analyze associated data to determine a possibility of a security threat (e.g., a risk score) associated with the possible lateral movement. In some cases, the AI engine 142 may identify a user and or a user group associated with a machine initiating the communication path, a time of day that communications are occurring, an amount of data accessed or transferred, a type of data to be accessed or transferred, a permission level associated to the data and/or the user or user group, a source and/or destination of a data transfer, and the like. The AI engine 142 may analyze a communication packet to identify one or more users and/or user groups associated with suspected lateral movement, a source computing device and/or a destination computing device. In some cases, the AI engine 142 may analyze the aggregated communication information to identify NetBIOS service scanning, such as for information identifying signs of host scanning, such as by identifying whether attempts to connect to multiple destination ports such as by analyzing network flow logs and/or firewall logs and correlating the scan data to a port associated with suspect communications.

In some cases, the AI engine 142 may analyze connection information to determine an amount of data being transferred and/or a type of data being transferred. For example, the AI engine 142 may learn patters of use associated with service or IT group users transferring updates to operating systems and/or applications via a host to host connection. However, a file transfer initiated from a machine associated with a user associated with a sales group or a human resources group may be unlikely. As such, the AI engine 142 may associate a higher likelihood (e.g., a greater weight) of lateral movement to data transfers initiated from a host associated with a user group associated with a human resources group than the user associated with the IT group.

At 208, the AI engine 142 may identify potential instances of unauthorized lateral movement based on an output of the AI algorithm. For example, an illustrative algorithm may include a weighted combination of lateral movement identification parameters, such as those discussed above. In an illustrative case, a risk score (R) corresponding to a probability that a message may be associated with a lateral movement event may be calculated as:

$$R = a_1 X_1 + a_2 X_2 \ldots + a_n X_n \qquad (1)$$

where: $a_x$=weighting factors (e.g., 0 ... 1.0, 0 ... 10.0) and $X_y$=lateral movement identification parameters (e.g., user group, connection type, device type, time of day, and the like).

The AI engine 142 may compare the risk score R to a threshold to determine whether to generate an alert at 215. For example, R>threshold (e.g., 0.5) may generate an alert, otherwise (R≤threshold) the lateral movement ID tool 140 may continue to monitor and or analyze network communications at 202. If, at 215, an alert is to be generated (e.g., R>threshold), the lateral movement ID tool may identify an alert configuration at 214 and send the alert at 214 based on the alert configuration. For example, the alert configuration may specify an alert type (e.g., an email, a text, an instant message, a phone call, and the like) based on a severity of the risk, a location of the host, and the like. For example, for critical hosts and/or information, an alert may be triggered to be sent to an IT head and/or communications to and from a particular host 134 may be shutdown, at least temporarily. In some cases, e.g., for risk scores close to the threshold value, alerts may be sent, but communications may be allowed to continue, such as under supervised conditions. In some cases, the alert may be pushed as a visual or audio indication at a user interface 162 at a central location on the private network 115, on a user interface associated with the local host 134, on a user interface at a destination host (e.g., host 132) of the host to host connection, and/or at a user interface of a remote computing device 112 (e.g., a mobile device, a desktop device, a computing device at a security center, and the like).

At 218, the correlation information identified by the AI engine 142 may be stored in a local data store (e.g., data store 144) to be used by the lateral movement identification tool 140 to train the algorithm and/or model and/or to a remote data store 170 or 144 to be used by the lateral movement identification tool 140 installed on a different host 136 and/or by a centrally located lateral movement identification tool 140 installed on the server 124.

Figure 3:
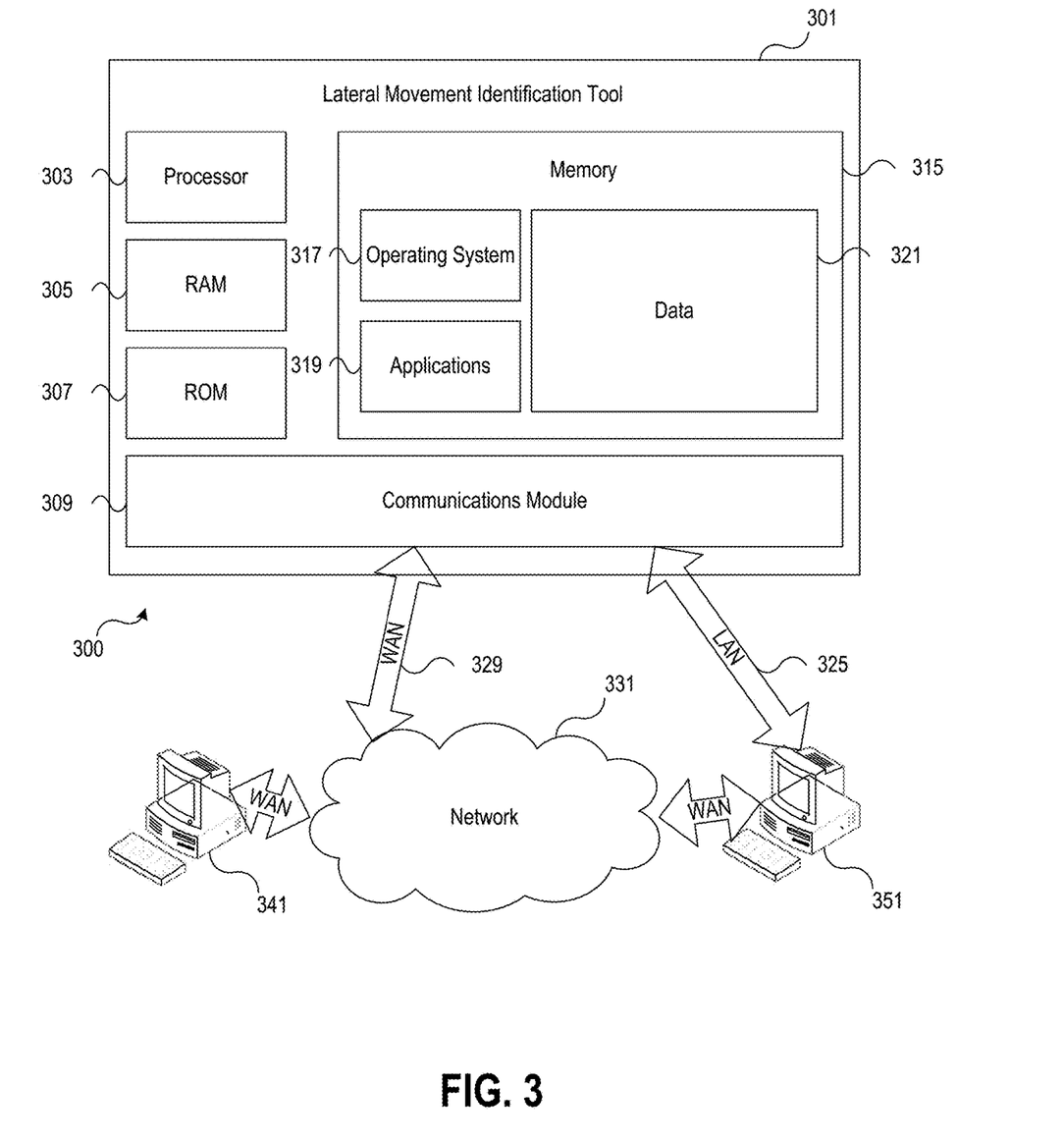
FIG. 3 shows an illustrative artificial intelligence-based computing environment in which various aspects of the disclosure may be implemented in accordance with one or more aspects described herein.

FIG. 3 shows an illustrative operating environment in which various aspects of the present disclosure may be implemented in accordance with one or more example embodiments. Referring to FIG. 3 a computing system environment 300 may be used according to one or more illustrative embodiments. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 may include an illustrative lateral movement identification tool 301 having a processor 303 for controlling overall operation of the lateral movement identification tool 301 and its associated components, including a Random Access Memory (RAM) 305, a Read-Only Memory (ROM) 307, a communications module 309, and memory 315. The lateral movement identification tool 301 may include a variety of computer readable media. Computer readable media may be any available media that may be accessed by the lateral movement identification tool 301, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the lateral movement identification tool 301.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 303 of the lateral movement identification tool 301. Such a processor may execute computer-executable instructions stored on a computer-readable medium.

Software may be stored within the memory 315 and/or other digital storage to provide instructions to the processor 303 for enabling the lateral movement identification tool 301 to perform various functions as discussed herein. For example, the memory 315 may store software used by the lateral movement identification tool 301, such as an operating system 317, one or more application programs 319, and/or an associated database 321. In addition, some or all of the computer executable instructions for the lateral movement identification tool 301 may be embodied in hardware or firmware. Although not shown, the RAM 305 may include one or more applications representing the application data stored in the RAM 305 while the lateral movement identification tool 301 is on and corresponding software applications (e.g., software tasks) are running on the lateral movement identification tool 301.

The communications module 309 may include a microphone, a keypad, a touch screen, and/or a stylus through which a user of the lateral movement identification tool 301 may provide input, and may include one or more of a speaker for providing audio output and a video display device for providing textual, audiovisual and/or graphical output. The computing system environment 300 may also include optical scanners (not shown).

The lateral movement identification tool 301 may operate in a networked environment supporting connections to one or more remote computing devices, such as the computing devices 341 and 351. The computing devices 341 and 351 may be personal computing devices or servers that include any or all of the elements described above relative to the lateral movement identification tool 301.

The network connections depicted in FIG. 3 may include a Local Area Network (LAN) 325 and/or a Wide Area Network (WAN) 329, as well as other networks. When used in a LAN networking environment, the lateral movement identification tool 301 may be connected to the LAN 325 through a network interface or adapter in the communications module 309. When used in a WAN networking environment, the lateral movement identification tool 301 may include a modem in the communications module 309 or other means for establishing communications over the WAN 329, such as a network 331 (e.g., public network, private network, Internet, intranet, and the like). The network connections shown are illustrative and other means of establishing a communications link between the computing devices may be used. Various well-known protocols including, but not limited to, protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 4:
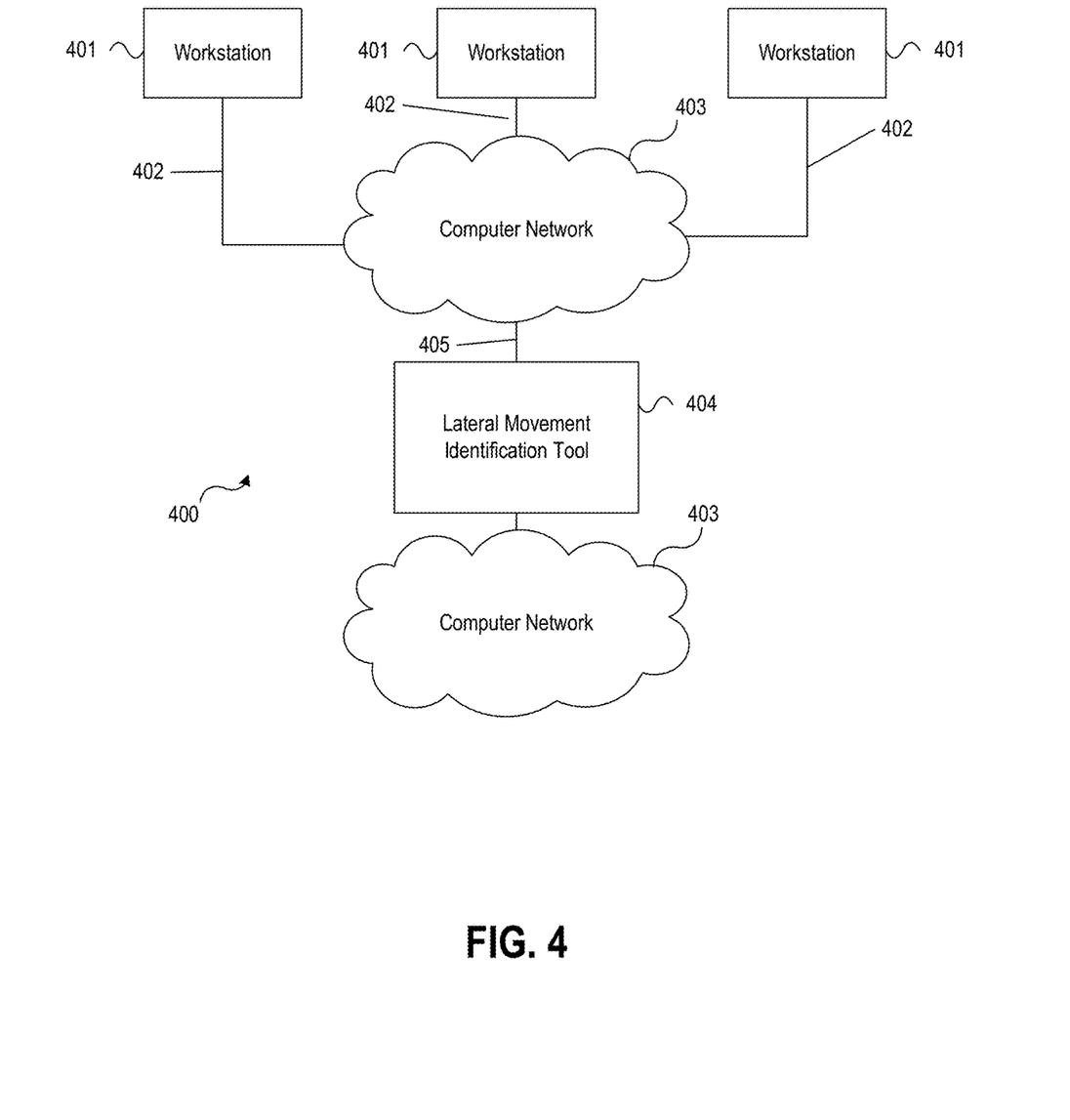
FIG. 4 shows an illustrative block diagram of workstations and servers that may be used to implement the processes and functions of certain aspects of the present disclosure in accordance with one or more aspects described herein.

FIG. 4 shows an illustrative block diagram of workstations and servers that may be used to implement the processes and functions of certain aspects of the present disclosure in accordance with one or more example embodiments. For example, an illustrative system 400 may be used for implementing illustrative embodiments according to the present disclosure. As illustrated, the system 400 may include one or more workstation computers 401. The workstation 401 may be, for example, a desktop computer, a smartphone, a wireless device, a tablet computer, a laptop computer, and the like, configured to perform various processes described herein. The workstations 401 may be local or remote, and may be connected by one of the communications links 402 to a computer network 403 that is linked via the communications link 405 to a lateral movement identification tool 404. In the system 400, the lateral movement identification tool 404 may be a server, processor, computer, or data processing device, or combination of the same, configured to perform the functions and/or processes described herein. The lateral movement identification tool 404 may be used to analyze communications sent and received from a local host to identify potential instances of lateral movement.

The computer network 403 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 402 and 405 may be communications links suitable for communicating between the workstations 401 and the lateral movement identification tool 404, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform comprising:
a processor; and
memory storing instructions that, when executed by the processor, cause the computing platform to:
identify, from real-time monitored network communications, a communication between the computing platform and a computing device;
determine, by an artificial intelligence engine and based on an indication of a risk factor associated with the communication and based on an indication of a user group, a probability that the communication corresponds to an unauthorized lateral movement event on a network, wherein the risk factor is associated with a network security risk and wherein the user group comprises a group of users having a same set of user group permissions on an enterprise network associated with the monitored network communications; and
trigger, based on the probability, an alert identifying the risk factor that the communication between the computing platform and the computing device corresponds to the unauthorized lateral movement event on the network, wherein the alert comprises a risk score corresponding to a weighted combination of a plurality of lateral movement parameters.

2. The computing platform of claim 1, wherein the instructions, when executed, cause the computing platform to aggregate information from a plurality of network communication services and data logs, wherein the information corresponds to a plurality of network communication connections to and from the computing platform.

3. The computing platform of claim 2, wherein the instructions, when executed cause the computing platform to correlate messages, in real time, with the aggregated information to actively detect an indication of lateral movement on the network.

4. The computing platform of claim 1, wherein the instructions, when executed cause the computing platform to send, via a telecommunications network, the alert to a second user computing device.

5. The computing platform of claim 1, wherein the communication between the computing platform and the computing device comprises a file transfer.

6. The computing platform of claim 1, wherein the risk factor comprises one or more of a plurality of risk factors, wherein an indication of the unauthorized lateral movement event on the network comprises a weighted combination of the plurality of risk factors and wherein the plurality of risk factors comprise one or more of a time associated with the communication between the computing platform and the computing device and user group permissions corresponding to a user associated with the communication.

7. The computing platform of claim 1 wherein the computing platform comprises a local host computing device.

8. The computing platform of claim 1 wherein the computing device is communicatively coupled to a network and sends communications via the network and receives communications from the network.

9. A system comprising:
a computing device sending and receiving communications via a network;
a local host computing device comprising:
a processor; and
memory storing instructions that, when executed by the processor, cause the local host computing device to:
identify, in real time, a communication between the local host computing device and the computing device, wherein the communication is identified from a plurality of communications associated with the computing device and a user group;
determine, by an artificial intelligence engine and based on a risk factor associated with the communication and based on the user group, a probability that the communication corresponds to an unauthorized lateral movement event on the network, wherein the risk factor is associated with network security risk and wherein the user group comprises a group of users having a same set of user group permissions on an enterprise network associated with the monitored network communications; and
trigger, based on the probability, an alert identifying the probability that the communication corresponds to the unauthorized lateral movement event on the network, wherein the alert comprises a risk score corresponding to a weighted combination of a plurality of lateral movement parameters.

10. The system of claim 9, wherein the instructions, when executed, cause the local host computing device to:
aggregate, from a plurality of network communication services and data logs, information corresponding to a plurality of network communication connections associated with the local host computing device; and
correlate, in real time, messages with the aggregated information to actively detect an indication of lateral movement on the network.

11. The system of claim 9, wherein the instructions, when executed sending, via a telecommunications network, the alert to a remote user computing device.

12. The system of claim 9, wherein the communication between the local host computing device and the computing device comprises a file transfer.

13. The system of claim 9, wherein an indication of the unauthorized lateral movement event on the network comprises a risk score corresponding to a weighted combination of risk factors.

14. The system of claim 13, wherein the risk factors comprise one or more of a time associated with the communication between the local host computing device and the computing device and a user group corresponding to a user associated with the communication.

15. A method comprising:
identifying, in real time by a lateral movement identification tool and from a plurality of monitored network communications associated with a user group, an indication of a file transfer between a first host device and a second host device;
determining, by an artificial intelligence engine and based on a risk factor of a plurality of risk factors associated with the user group, a probability that the indication that the file transfer corresponds to a possible unauthorized lateral movement event on the network, wherein the plurality of risk factors comprise different factors associated with network security risk and wherein each user of the user group has common user group permissions on an enterprise network associated with the monitored network communications; and
sending, based on the probability, an alert identifying the possible unauthorized lateral movement event on the network, wherein the alert comprises a risk score corresponding to a weighted combination of a plurality of lateral movement parameters.

16. The method of claim 15, wherein the lateral movement tool is distributed over a plurality of computing devices.

17. The method of claim 15, wherein a portion of lateral movement identification tool is installed on the first host device.

18. The method of claim 15, comprising:
aggregating information from a plurality of network communication services and data logs, wherein the information corresponds to a plurality of network communication connections to and from the first host device; and
correlating messages, in real time, with the aggregated information to actively detect an indication of lateral movement on the network.

19. The method of claim 15, wherein sending the alert comprises providing an indication of the alert on a user interface device and identifying the file transfer.

20. The method of claim 15, wherein alert comprises a risk score corresponding to a weighted combination of the plurality of risk factors.

* * * * *